Sept. 12, 1939.　　　　G. M. GIANNINI　　　　2,172,871
ACOUSTIC APPARATUS
Filed Jan. 10, 1938　　　　2 Sheets-Sheet 1
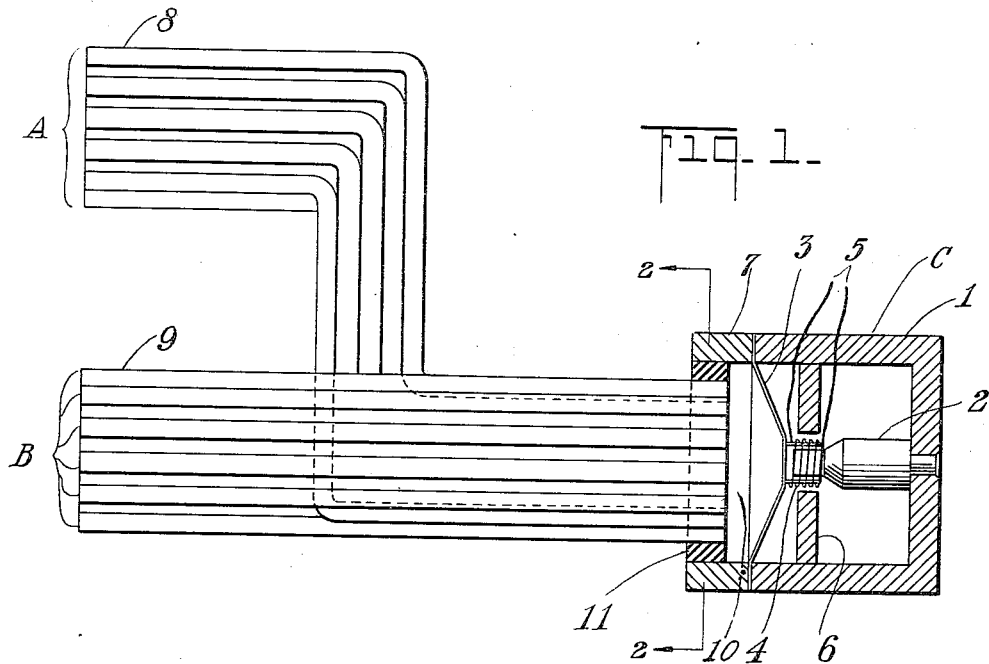
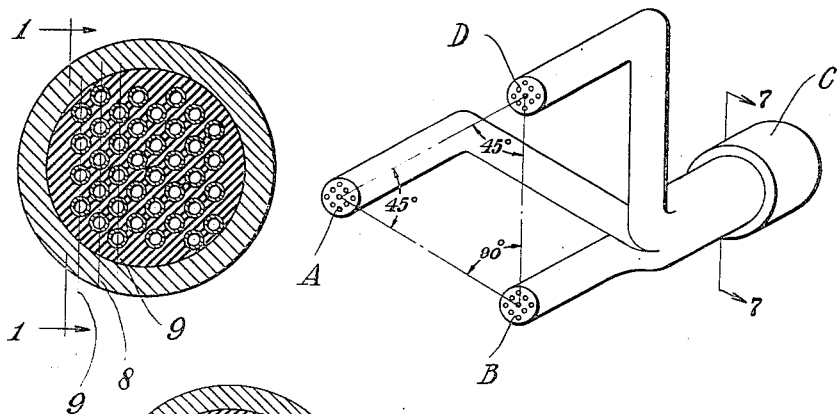
INVENTOR.
GABRIEL M. GIANNINI
ATTORNEY.

Sept. 12, 1939.    G. M. GIANNINI    2,172,871
ACOUSTIC APPARATUS
Filed Jan. 10, 1938    2 Sheets-Sheet 2
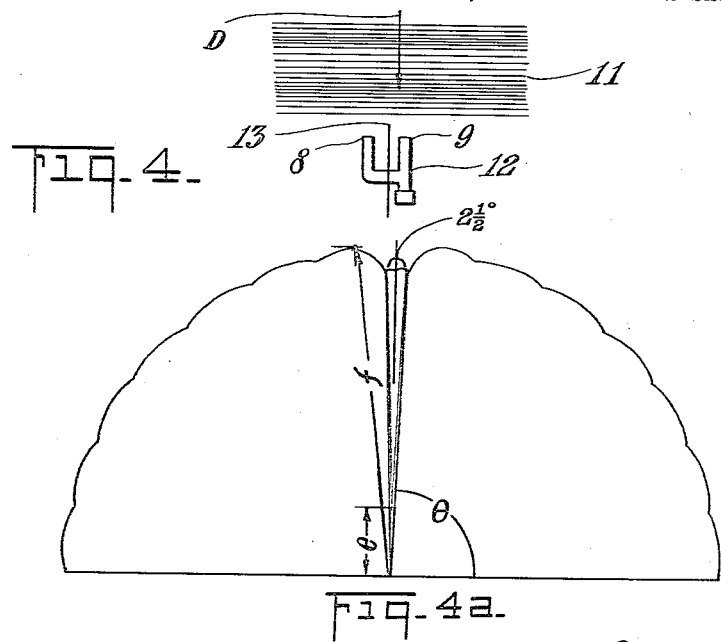
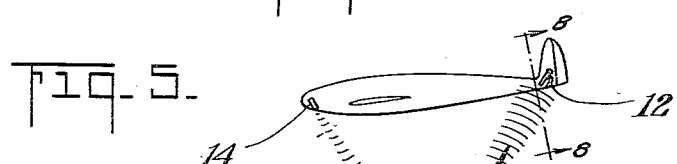
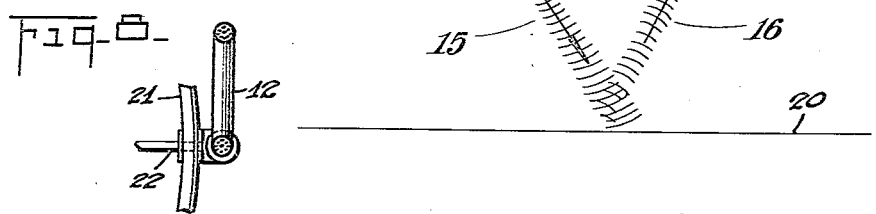
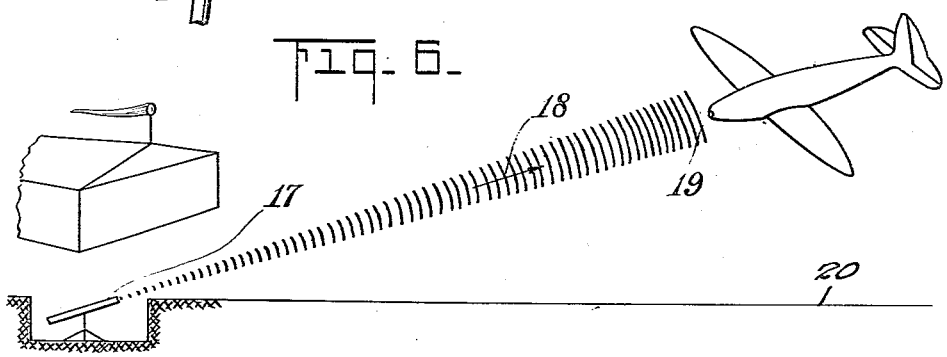
INVENTOR.
GABRIEL M. GIANNINI
BY
ATTORNEY.

Patented Sept. 12, 1939

2,172,871

UNITED STATES PATENT OFFICE 2,172,871

ACOUSTIC APPARATUS

Gabriel Maria Giannini, Great Neck, N. Y., assignor to Automatic Electric Company, Chicago, Ill., a corporation of Delaware Application January 10, 1938, Serial No. 184,285

5 Claims. (Cl. 181—26)

My invention relates to acoustic devices for determining the direction of propagation of sound waves, and to locating- and distance-measuring systems using such devices.

As my inventiton is particularly applicable for use in aviation, I shall describe the same in this connection. However, it is not limited thereto but is equally applicable for use in any detecting or measuring system in which it is desired to accurately and readily determine the direction of propagation of a sound wave, for instance in marine navigation.

The main object of my invention is to provide a sound translating device which is very sensitive to sound waves of a given frequency and has very high directional characteristics.

Another object of my invention is to provide an acoustic system for accurately and readily determining the position of an airplane from a point on the ground, or vice versa.

A further object of my invention is to provide a simple acoustic altimeter for accurately and quickly determining the distance of a plane from the ground when landing or during low flying.

Further objects of my invention will appear as the description progresses.

The device according to the invention, whose operation is based on the interference of sound waves, comprises a plurality of tubular impedance elements one of which differs in acoustic wavelength from the others by one-half, or one-half plus an integer, of the wave-length of the sound to be detected, coupled to a sound-translating device, such as a microphone. When these elements are so arranged that their receiving ends lie parallel to a wave front, the sound transmitted through different impedance elements will reach the sound-translating device 180° out of phase, and the resulting sound will be nil or minimum; whereas only a slight displacement from this position will produce a relatively high response.

The present invention also includes a method and apparatus by which an aviator can rapidly determine his distance from the ground when landing. For this purpose I propagate toward the ground, sound waves of a predetermined and substantially monochromatic frequency from a generator located at one point on the plane, and determine the direction of the sound waves reflected from the ground, by means of the receiving device according to the invention, which is located at another point on the plane. The distance of the plane from the ground can be readily ascertained from the known distance between the sound generator and the receiving device and the angle which the receiving device makes with this line when adjusted to give a minimum response, and can be read directly from a properly-calibrated scale.

In order that the invention may be clearly understood and readily carried into effect, I shall describe the same in more detail with reference to the accompanying drawings, in which:

Figure 1 is a sectionized side-view of a receiving device according to the invention;

Fig. 2 is a section through line 2—2 of Fig. 1;

Fig. 3 is a perspective view of a receiving device according to another embodiment of the invention;

Fig. 4 is a diagram illustrating the operation of the device shown in Figs. 1 and 2;

Fig. 4a is a graph showing the directional characteristics of the device shown in Figure 3;

Fig. 5 is a diagram illustrating an apparatus and method for determining the distance of an airplane from the ground;

Fig. 6 is a diagram illustrating a system for landing a plane with the sound-receiving device of Figs. 1 to 3, Fig. 7 is a sectional view on an enlarged scale along line 7—7 of Figure 3, and Fig. 8 is a sectional view on an enlarged scale along line 8—8 of Figure 5.

The planar receiver illustrated in Figs. 1 and 2 comprises two impedance elements A and B and a microphone unit C, which is of the moving coil type, and comprises a cup-shaped permanent magnet 1 carrying a core 2 of soft iron. Supported from its edge by magnet 1 is a conical diaphragm 3 which carries at its vertex a coil 4 having leads 5. A ring 6 of soft iron supported by magnet 1 serves to complete the magnetic circuit and form an intense magnetic field in the vicinity of coil 5. By a "planar" receiver is meant one that is responsive in a single plane or line. It should be noted that it is unnecessary to use a microphone of the type shown, although such a microphone gives very good results.

A ring 7 of non-magnetic material secures cone 3 to magnet 1, and also forms a matching chamber 10. Secured to ring 7, for instance by means of a suitable wax 11, are two impedance elements A and B.

As shown, impedance element A consists of nineteen metal tubes 8, for instance of copper or plastic material of equal length and having an inside diameter of about ¼″, whereas impedance element B consists of nineteen tubes 9, which also are of equal length. In accordance with the invention tubes 8 differ in length from tubes 9 by ½, or by an integer plus ½, of the wave-length of the sound whose direction is to be determined. More particularly, if tubes 9 have a length equal to one wave-length of the sound to be recorded, tubes 8 may have a length equal to 1½, 2½, 3½ . . ., etc., wave-lengths.

The tubes 9 are straight and parallel, whereas the tubes 8 are so bent that their receiving ends lie in a plane with the receiving ends of tubes 9. Furthermore, all the tubes are preferably so arranged that their right-hand ends are substantially uniformly distributed over the opening of the microphone, as more clearly shown in Fig. 2 in which the ends of tubes 8 and 9 lie in alternate vertical rows. Such a construction is somewhat difficult to illustrate in a clear manner, but it can be readily produced by cutting all the tubes of each group of the same length, securing them at one end to the ring 7, and then bending the tubes 8 so their free ends lie in a plane as shown.

In the present instance the receiver is designed to detect the wave fronts of sound waves having a frequency of about 2,000 vibrations per second. In order to keep the dimensions of the receiver as small as possible, the tubes 9 were given a length of about 12 inches, and tubes 8 were given a length of about $12'' + \frac{1}{2}\lambda = 12 + 3 = 15''$.

The receiver illustrated in Fig. 3, which can be considered as a two-dimensional receiver, is the same as that shown in Fig. 1 except that it has a third impedance element D which is the same as element A except that it is displaced ninety degrees, i. e., the open ends of elements A, B, and D lie in a plane and substantially at the vertices of a right angle isosceles triangle. In this case also the tubes are so arranged that their ends are evenly distributed over the diaphragm of the transmitter. This is shown in Figure 7 in which the tubes of element A are indicated by crosses, the tubes of element D are indicated by dots, and the remaining tubes are those of element B. By a two-dimensional receiver is meant one that is responsive in two dimensions. More particularly if a planar receiver were used to detect the location of an airplane from which sound is propagated it would be possible to locate the plane accurately only in a plane. However, with a two-dimensional receiver it would be possible to locate the airplane in a line.

The directional characteristics of a receiver according to the invention is illustrated in Figures 4 and 4a in which reference numeral 11 indicates a sound-wave having a direction D and a substantially monochromatic frequency of, for instance, 2000 vibrations per second ±10%, and reference numeral 12 indicates a receiver such as shown in Fig. 1 having an axis 13.

In the polar graph of Figure 4a the radius vectors indicate the intensity of sound received by receiver 12 when it is arranged with its axis lying in the direction of the vector. For example, when receiver 12 is in the position shown, i. e., with its axis 13 parallel to the direction of propagation D of wave 11, the intensity of the sound received will be equal to $e$. When the receiver is rotated 2½ degrees from this position, i. e., $\theta = 87\frac{1}{2}\%$, the sound intensity increases to a value indicated by $f$, which is about five times as great as $e$. Thus, it is seen that the receiver according to the invention is very directional, i. e., when it is rotated through an angle of only 2½ degrees there is a change in intensity of about 80%, which makes it possible to locate the direction of propagation of a wave front with great accuracy. This accuracy may be varied by varying the distance between the ends of the impedance elements—the more apart the openings are the greater the accuracy will be.

While Fig. 4a illustrates the characteristics of a receiver of the type illustrated in Fig. 1, the same results, but in two dimensions, are obtained with the receiver of Fig. 3.

Because of these extremely good directional characteristics, receivers of the type according to the invention have a very wide range of applications, especially in aviation and in marine navigation. As stated, my invention also includes a method and apparatus for determining the distance that a plane is from the ground when landing or flying low, by using the receiver according to the invention.

Such an apparatus and method is illustrated in Fig. 5 in which a receiver 12, such as illustrated in Fig. 1, is supported on the tail of the fuselage of a plane and a sound generator 14 is located at the front of the plane. Generator 14 is of the type which generates sound waves of a substantially monochromatic frequency, and as such generators are well known in the art, further description or illustration of the same are believed to be unnecessary. The manner in which the receiver 12 is mounted on the plane is more clearly shown in Figure 8. In this figure the reference numeral 21 indicates the fuselage of the plane. The receiver 12 is mounted on a pivot 22 which is rotatably mounted on the fuselage 21 so that the receiver can be rotated in a plane perpendicular to the plane of the drawings.

Generator 14 propagates toward the ground, sound waves indicated by reference numeral 15, which are reflected toward the plane as sound waves 16. Receiver 12 is then rotated in the plane of the drawings until there is a minimum response, and the distance from the ground can be computed from the angle which the axis of the receiver makes with the line between the generator and receiver, and the distance between the receiver and generator, or can be read directly from a properly calibrated scale.

Such a method of determining the distance is very accurate, and becomes more so as the plane approaches the ground, particularly when the plane is less than 10 plane lengths from the ground. This makes the method particularly useful in landing an airplane, because when landing it is very important that the aviator knows when the plane is about 10 feet above the ground in order that he may level off and effect a three-point landing.

I am well aware of the fact that sound-wave altimeters have been proposed for determining the distance of aircraft from the ground. However, such altimeters have been based on measuring the time interval required for a sound generated on an aircraft to be reflected from the earth and returned to the aircraft. Such systems, however, are relatively complicated and have a low degree of accuracy when the plane is relatively near the ground. On the contrary, my apparatus becomes more accurate as the distance between the plane and the ground becomes less, which as stated makes it particularly adapted for landing a plane.

Figure 6 illustrates a method of landing a plane by means of a directional receiver according to the invention. As shown, a sound generator 17 located on the ground propagates toward the plane sound waves 18 of a predetermined and substantially monochromatic frequency. Located on the plane is a receiver 19 of the type illustrated in Fig. 3, by means of which the aviator may readily and accurately detect the direction of the sound waves and effect a proper landing.

The expression "an integer plus ½ the wave length" as used in the claims is to be understood to include ½ the wave length, i. e., assuming zero to be an integer.

While I have described my invention in connection with specific examples and with reference to particular applications, I do not wish to be limited thereto, but desire the appended claims to be construed as broadly as permissible in view of the prior art.

What I claim is:

1. A device for determining the direction of the wave front of a sound of predetermined and substantially monochromatic frequency comprising a sound-translating device, and a plurality of hollow impedance members having one end connected to said sound-translating device and their other ends spaced apart in a common plane, one of said members differing in acoustic wave length from the remaining members by an integer plus ½ the wave-length of the sound to be received.

2. A device for determining the direction of the wave front of a sound of predetermined and substantially monochromatic frequency comprising a sound-translating device, and two groups of impedance members connected between said sound-translating device and the sound to be received with their receiving ends spaced apart in a common plane, the members of each group being of substantially equal length and the members of one group differing in acoustic wave-length from the members of the other group by an integer plus ½ the wave-length of the sound to be received.

3. A device for determining the direction of the wave front of a sound of predetermined and substantially monochromatic frequency comprising a sound-translating device having a diaphragm, and a plurality of impedance elements connected between said sound-translating device and the sound to be received with their receiving ends spaced apart in a common plane and with their other ends distributed substantially uniformly with respect to said diaphragm, each of said elements comprising a plurality of tubular members of the same length, the members of one of said elements differing in acoustic wave-length from the other members by an integer plus ½ of the wave-length of the sound to be received.

4. A device for determining the direction of the wave front of a sound of predetermined and substantially monochromatic frequency comprising a sound-translaitng device, and three groups of tubular impedance members having one end connected to said receiver and their other ends spaced apart in a common plane substantially at the vertices of a right angle isosceles triangle, the members of one of said groups differing in acoustic wave-length from the members of the other two groups by an integer plus ½ the wave-length of the sound to be received.

5. In combination a generator for propagating sound waves of a substantially monochromatic frequency, and a device for determining the direction of the wave front of said sound waves comprising a sound-translating device, and two tubular impedance elements having one of their ends lying in a common plane and their other ends connected to said sound-translating device, one of said elements differing in acustic wave length from the other element by an integer plus ½ the wave length of said sound waves.

GABRIEL MARIA GIANNINI.